(12) United States Patent
Shen et al.

(10) Patent No.: US 8,934,787 B2
(45) Date of Patent: Jan. 13, 2015

(54) SHARED WAVELENGTH LOCKER WITH A PERIODIC TRANSMISSION FILTER IN A NETWORK COMMUNICATION PATH

(75) Inventors: Xiao A. Shen, San Bruno, CA (US); Tongqing Wang, Palo Alto, CA (US); Hongbing Lie, Sunnyvale, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 650 days.

(21) Appl. No.: 13/248,517

(22) Filed: Sep. 29, 2011

(65) Prior Publication Data
US 2013/0084073 A1 Apr. 4, 2013

(51) Int. Cl.
H04B 10/00 (2013.01)
H04J 14/02 (2006.01)
H04B 10/50 (2013.01)
H04B 10/572 (2013.01)

(52) U.S. Cl.
CPC ............ *H04J 14/02* (2013.01); *H04J 14/0276* (2013.01); *H04B 10/506* (2013.01); *H04B 10/572* (2013.01)
USPC .......................................... 398/195; 398/196

(58) Field of Classification Search
USPC ........................................................ 398/195
See application file for complete search history.

(56) References Cited

U.S. PATENT DOCUMENTS

| | | | |
|---|---|---|---|
| 6,560,252 | B1 | 5/2003 | Colbourne et al. |
| 7,639,955 | B2 | 12/2009 | Zheng et al. |
| 2002/0048063 | A1* | 4/2002 | Jung et al. .................... 359/124 |
| 2007/0012860 | A1* | 1/2007 | Mahgerefteh et al. ........ 250/205 |
| 2008/0095536 | A1 | 4/2008 | Shen et al. |
| 2011/0085794 | A1* | 4/2011 | Lei et al. ......................... 398/25 |

FOREIGN PATENT DOCUMENTS

| | | |
|---|---|---|
| EP | 2112728 A1 | 10/2009 |
| EP | 2341643 A1 | 7/2011 |

OTHER PUBLICATIONS

"Broadband (Fabry-Perot) Wavelength Locker," JDSU, Communications Components, Product Specification, JDS Uniphase Corporation, Sep. 2008, 5 pages.
"Characteristics of a Single-Mode Optical Fibre and Cable," Series G: Transmission Systems and Media, Digital Systems and Networks—Transmission Media Characteristics—Optical Fibre Cables, ITU-T Recommendation G.652, Jun. 2005.

(Continued)

*Primary Examiner* — Danny Leung
(74) *Attorney, Agent, or Firm* — Conley Rose, P.C.; Grant Rodolph; Jonathan K. Polk

(57) ABSTRACT

An apparatus comprising a plurality of optical transmitters and a wavelength locker shared by the plurality of optical transmitters. A periodic transmission filter used for wavelength locker operations is in a network communication path and shapes optical transmissions from the plurality of optical transmitters to a network. An apparatus comprising at least one processor configured to receive a pre-filter signal corresponding to part of an optical signal comprising a pilot tone and to receive a post-filter signal corresponding to a part of the optical signal that passes through a period transmission filter, wherein a filtered part of the optical signal is directed into a network. The processor is also configured to perform wavelength locking based on a quadrature detection technique that aligns an adiabatic logical one position of a modulated transmission signal with a spectral transmission peak of the period transmission filter.

16 Claims, 9 Drawing Sheets

(56) References Cited

OTHER PUBLICATIONS

"Characteristics of a Dispersion-Shifted Single-Mode Optical Fibre and Cable," Series G: Transmission Systems and Media, Digital Systems and Networks—Transmission Media Characteristics—Optical Fibre Cables, ITU-T Recommendation G.653, Dec. 2006.

"Characteristics of a Cut-Off Shifted Single-Mode Optical Fibre and Cable," Series G: Transmission Systems and Media, Digital Systems and Networks—Transmission Media Characteristics—Optical Fibre Cables, ITU-T Recommendation G.654, Dec. 2006.

"Characteristics of a Non-Zero Dispersion-Shifted Single-Mode Optical Fibre and Cable," Series G: Transmission Systems and Media, Digital Systems and Networks—Transmission Media Characteristics—Optical Fibre Cables, ITU-T Recommendation G.655, Mar. 2006.

"Characteristics of a Fibre and Cable with Non-Zero Dispersion for Wideband Optical Transport," Series G: Transmission Systems and Media, Digital Systems and Networks—Transmission Media Characteristics—Optical Fibre Cables, ITU-T Recommendation G.656, Dec. 2006.

"Spectral Grids for WDM Applications—DWDM Frequency Grid," Series G: Transmission Systems and Media, Digital Systems and Networks—Transmission Media Characteristics—Characteristics of Optical Components and Subsystems, ITU-T Recommendation G.694.1, Jun. 2002.

"Spectral Grids for WDM Applications: CWDM Wavelength Grid," Series G: Transmission Systems and Media, Digital Systems and Networks—Transmission Media Characteristics—Characteristics of Optical Components and Subsystems, ITU-T Recommendation G.694.2, Dec. 2003.

Matsui, et al., "Chirp-Managed Directly Modulated Laser (CML)," IEEE Photonics Technology Letters, vol. 18, No. 2, Jan. 15, 2006, 3 pages.

Foreign Communication From a Counterpart Application, PCT Application PCT/CN2012/082413, International Search Report dated Jan. 10, 2013, 6 pages.

Foreign Communication From a Counterpart Application, PCT Application PCT/CN2012/082413, Written Opinion dated Jan. 10, 2013, 4 pages.

* cited by examiner

US 8,934,787 B2

SHARED WAVELENGTH LOCKER WITH A PERIODIC TRANSMISSION FILTER IN A NETWORK COMMUNICATION PATH

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional wavelength division multiplexing (WDM) transmitter arrays may employ semiconductor lasers as optical transmitters. The performance of the lasers and hence the WDM systems is often judged by their wavelength stability and reach. The wavelengths of the WDM laser arrays may vary due to manufacturing process variations, device age, temperature, or other factors. Wavelength locking can facilitate signal integrity even when the lasers' wavelengths vary over time.

One approach to provide wavelength locking has been to employ a feedback system to compare actual laser output wavelength to the target laser output wavelength. Laser output can then be adjusted to correct for deviations. For discrete transmitters, a wavelength locker is used for each laser. As the number of individual optical transmitters increases, the complexity and cost for wavelength locking may also increase. What is needed is a way to provide efficient and cost-effective wavelength locking, especially in the case of transmitter arrays where one locker per laser approach is not practical. Extending the reach of a transmitter often involves extensive engineering on lasers, making the transmitters more costly. Meanwhile, inexpensive transmitters like those utilizing directly modulated lasers often have short reaches.

SUMMARY

In an embodiment, the disclosure includes an apparatus comprising a plurality of optical transmitters and a wavelength locker shared by the plurality of optical transmitters. A periodic transmission filter used in operations of the wavelength locker is in a network communication path and shapes optical transmissions from the plurality of optical transmitters to a network In an embodiment, the disclosure includes an apparatus comprising at least one processor configured to receive a pre-filter signal corresponding to part of an optical signal comprising a pilot tone and to receive a post-filter signal corresponding to a part of the optical signal that passes through a periodic transmission filter, wherein a filtered part of the optical signal is directed into a network. The processor is also configured to perform wavelength locking based on a quadrature detection technique that aligns an adiabatic logical one position of a modulated transmission signal with a spectral transmission peak of the period transmission filter.

In an embodiment, the disclosure includes a method comprising receiving, by a processor, digitized signals corresponding to an optical signal from an direct modulated laser (DML) transmitter and to a pilot tone from a signal generator. The method also comprises performing wavelength locking based on the digitized signals and based on quadrature detection to align an adiabatic logical one position of a modulated DML transmitter output with a spectral transmission peak of a periodic transmission filter in a network communication path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
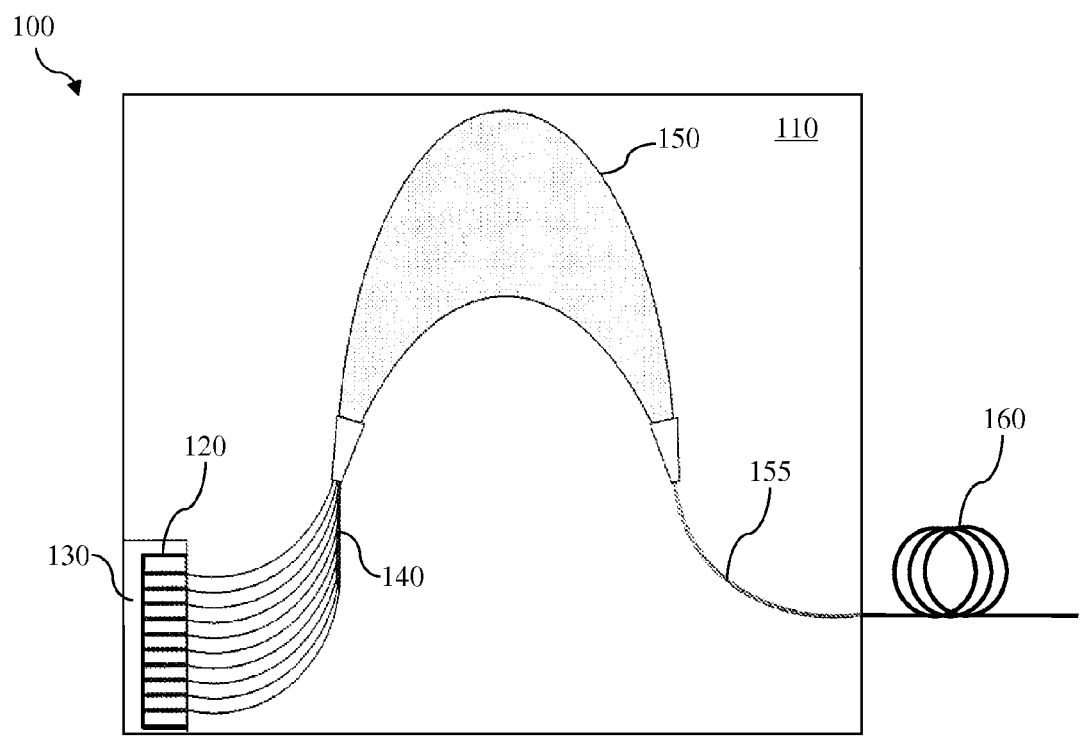
FIG. 1 is a top plan view of an embodiment of a WDM laser transmitter.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a practical and cost-effective technique to improve the performance of a dense wavelength division multiplexing (DWDM) transmitter array that utilizes directly modulated lasers (DMLs). Specifically, the disclosed invention provides a method and an apparatus in which a single periodic transmission filter (e.g., an etalon) is used for shared wavelength locker operations and for spectrally shaping optical transmitter signals directed into a network. In this manner, the wavelengths for the transmitter array are stabilized and the reach for optical transmitter signals is increased. In DWDM networks, a wavelength locker, like an etalon-based locker, is often used to ensure each transmitter operates at the desired wavelength, such as the ITU grid. In the disclosed invention, the same etalon can now be configured to achieve both wavelength stability (by using the etalon for wavelength locker operations) and longer reach for DMLs (by using the etalon to shape optical transmitter signals directed into a network).

Laser transmitter system embodiments as disclosed herein may comprise a plurality of optical transmitters, such as lasers, photodiodes, other devices configured to transmit electromagnetic waves at optical wavelengths, or combinations thereof. The optical wavelengths may comprise at least a portion of the visible wavelength range, infrared wavelength range, ultraviolet (UV) wavelength range, or other optical wavelength ranges. In an embodiment, the optical transmitters may be discrete transmitter units, which may be coupled to one another. For example, the discrete optical transmitters may be mounted in an array arrangement on a chip, card, or optical platform. When implemented on a chip, an array of transmitters may be referred to as integrated transmitters. The optical transmitters may also be coupled to an optical coupler, such as a multiplexer, which may be configured to combine the outputs from the different optical transmitters into a single output. The outputs from the different optical transmitters may have different wavelengths and the output from the optical coupler may comprise the different wavelengths of the optical transmitters. The optical coupler may be positioned on the same or different chip, card, or optical platform. The optical coupler may be coupled to the optical transmitters via a plurality of fibers or waveguides, and may also be coupled to an output via an additional fiber or waveguide. Additionally, the laser transmitter system may comprise a signal generator and a wavelength locking apparatus, which may be coupled to the optical transmitters and the optical coupler. The signal generator may provide a pilot signal onto the output of any of the optical transmitters, and the wavelength locking apparatus may lock the wavelength of an optical transmitter using the pilot tone, as described below. In an alternative embodiment, at least some of the components of the laser transmitter system may be integrated into a chip, such as a planar lightwave circuit (PLC).

FIG. 1 is a top plan view of an embodiment of a WDM laser transmitter 100. In at least some embodiments, the WDM laser transmitter 100 may correspond to a DWDM transmitter array that benefits from the use of a single periodic transmission filter (e.g., an etalon) for shared wavelength locker operations and for spectral shaping of optical transmission signals output to a network (improving the reach for DMLs) as described herein. As shown, the WDM laser transmitter 100 may comprise a platform 110, a laser dice 120 (also referred to herein as optical transmitter), a step 130, a plurality of first channels 140, an arrayed waveguide (AWG) 150, and optionally a second channel 155. The WDM laser transmitter 100 may also comprise or may be coupled to a fiber 160. These components may be configured according to known configurations, such as a hybrid integration configuration or a monolithic configuration. The WDM laser transmitter 100 may emit a plurality of distinct Dense WDM (DWDM) channels, as described in the International Telecommunication Union Telecommunication Standardization Sector (ITU-T) G.694.1, and/or coarse WDM (CWDM) channels, as described in the ITU-T G.694.2. As such, the WDM laser transmitter 100 may be suitable for use in backbone and/or access optical networks.

In an embodiment, the platform 110 may be configured to accommodate and integrate the components of the WDM laser transmitter 100. Specifically, the platform 110 may comprise at least one material that integrates, bonds, and/or supports the components of the WDM laser transmitter 100. The platform 110 may be produced using a deposition process, for instance on a chip or substrate. Further, the platform 110 may comprise a plurality of layers at different sites, which may be produced using deposition and/or etching. The layers may bind together other components of the WDM transmitter 100, such as the first channels 140, the AWG 150, and the second channel 155. Additionally, the layers may mount or support a component of the WDM laser transmitter 100, such as the laser dice 120. In an embodiment, the platform 110 may comprise a thin film layer of a dielectric material, such as silicon dioxide ($SiO_2$), which may be deposited on a substrate using chemical deposition, such as chemical solution deposition (CSD), chemical vapor deposition (CVD), and plasma-enhanced CVD (PECVD). Alternatively, the film layer may be deposited using physical deposition, such as thermal evaporation, sputtering, pulsed laser deposition, or cathodic arc deposition (arc-PVD). Other deposition processes also may be used, including reactive sputtering, molecular beam epitaxy (MBE), metalorganic vapor phase epitaxy (MOVPE), topotaxy, or any other suitable process. The thin film layer also may be etched at some regions of the platform 110 using wet chemical etching or dry plasma etching. The thin film layer may have a thickness less than about one mm, such as about ten micrometers.

The laser dice 120 may be the light emitting components of the WDM laser transmitter 100. The laser dice 120 may be coupled to the platform 110 and comprise a plurality of integrated semiconductor lasers, which may be configured in an array. For instance, an array of semiconductor lasers may be produced by depositing a lasing material, such as indium phosphide (InP) or gallium arsenide (GaAs), at a plurality of aligned sites on a chip. Alternatively, the lasing material may be added to the chip using chemical or electrochemical doping. The laser dice 120 may be laser diodes, heterostructure lasers, quantum well lasers, quantum cascade lasers, distributed feedback (DFB) lasers, combinations thereof, or other. The laser dice 120 may be configured to transmit a plurality of light waves substantially in the same direction, e.g., from the same side of the array. The laser dice 120 also may be configured to transmit the light waves at a plurality of wavelengths that span a bandwidth. In an embodiment, the wavelengths may be spaced by about the same value, where the difference between the values of any two wavelengths may be about the same. In an embodiment, the laser dice 120 may be coupled to the platform 110 via bonding.

In an embodiment, the laser dice 120 may be accommodated by the step 130 and the platform 110. For instance, the step 130 may be positioned at one edge of the platform 110 and coupled to the laser dice 120. The step 130 may comprise a layer of the platform 110, which may be produced via etching or deposition, and as such may comprise the same material as the platform 110, e.g. $SiO_2$. The step 130 also may be coupled to external electrical components, which may be used to operate and/or modulate the WDM laser transmitter 100, as described below.

The light emitted from the laser dice 120 may be transported to other components of the WDM laser transmitter 100 via the first channels 140. As such, the first channels 140 may be coupled to the laser dice 120 and the AWG 150 and may be aligned with the laser dice 120. The first channels 140 may comprise a plurality of waveguides, which may be configured to transfer the light from the laser dice 120 to the AWG 150. The waveguides may be dielectric waveguides, which may comprise a dielectric material that has a higher permittivity or dielectric constant than the surrounding platform 110. For example, the first channels 140 may be produced by depositing a layer of higher index material on the platform 110, etching the surrounding areas, and then depositing the same material as the platform 110 until the deposited material forms the upper cladding. Such a process may produce the same cladding material all around the channels 140. Thus, the light waves may be guided through the first channels 140 by total internal reflection from the laser dice 120 to the AWG 150.

The light waves transported by the first channels 140 may be combined into a single light wave at the AWG 150, and hence transmitted from the WDM laser transmitter 100. Accordingly, the AWG 150 may be coupled to the first channels 140 and the second channel 155. The AWG 150 may be an optical multiplex (MUX) configured to combine a plurality of light waves from the first channels 140 into a combined light wave that propagates in the second channel 155. For instance, the AWG 150 may comprise a plurality of grating waveguides, which may have different lengths, where each two adjacent grating waveguides may have about the same length difference. The light waves may correspond to the individual semiconductor lasers in the laser dice 120, where each light wave may have a different wavelength. The light waves may propagate through the grating waveguides, undergo a change of phase due to the length difference between the adjacent grating waveguides, and constructively interfere into the combined light wave at an output of the AWG 150. Hence, the combined light wave may comprise all the wavelengths of the individual light waves. The grating waveguides may be dielectric gratings waveguides, which may comprise the same material as the first channels 140, and may be produced using a process similar to the process used to produce the first channels 140.

The combined light may be transmitted from the WDM laser transmitter 100 using the second channel 155 and the fiber 160. The second channel 155 may comprise a dielectric waveguide, similar to the first channels 140. The second channel 155 may be coupled to the AWG 150 and the fiber 160, and as such may guide the combined light from the AWG 150 to the fiber 160. The second channel 155 may be produced using a process similar to the process used to produce the first channels 140. In an embodiment, the first channels 140, the AWG 150, and the second channel 155 may be positioned in the same layer of the platform 110 and may be aligned with the laser dice 120.

In an embodiment, the fiber 160 may be an optical fiber, which may be used to transport the combined light wave from the WDM laser transmitter 100 to an optical system, such as an optical telecommunications system or an optical network. Specifically, the fiber 160 may be used to transport WDM signals, such as the DWDM and/or CWDM signals described above. The fiber 160 may be a standard single mode fibers (SMFs) as defined in ITU-T standard G.652, dispersion shifted SMF as defined in ITU-T standard G.653, cut-off shifted SMF as defined in ITU-T standard G.654, non-zero dispersion shifted SMF as defined in ITU-T standard G.655, wideband non-zero dispersion shifted SMF as defined in ITU-T standard G.656, multimodal fiber, or any other type of fiber. All of the standards described herein are incorporated herein by reference.

In contrast to the disclosed technique which employs a shared wavelength locker scheme with a periodic transmission filter (e.g., an etalon) to achieve both wavelength stability and longer reach for all DMLs of a DWDM transmitter array, conventional wavelength locking schemes used in WDM applications may use a separate wavelength locker for each wavelength (e.g., for wavelength spacing of about 100 Gigahertz (GHz)). Alternatively, the disclosed technique is distinguished from existing shared wavelength lockers schemes, due to the position of the periodic transmission filter in the data transmission path and due to appropriate fine-tuning of the laser frequency and shared wavelength locker scheme as disclosed herein. Although the discussion regarding FIG. 1 describes how to hybrid integrate an DWDM transmitter array in general. The disclosed shared locker technique is not limited to integrated transmitter array. Rather, any discrete transmitter can also use the locker for wavelength stability as long as their wavelengths are evenly spaced on an ITU grid. In terms of performance improvement, the integration is not limited to DML.

In accordance with at least some embodiments, the disclosed apparatus and method facilitate the determination of a locking point of laser optical transmitters based on the adiabatic logical one position for the spectrum of the laser. The selection of the adiabatic logical one position for locking as disclosed herein results in a reduction in dispersion by reducing transient chirp and the adiabatic logical zero position. In addition, a single pilot signal generator can be employed, thereby minimizing cost and complexity. As disclosed herein, quadrature detection may be used to simultaneously stabilize multiple lasers of a WDM laser transmitter (e.g., WDM laser transmitter 100).

The use of quadrature detection as disclosed herein has a number of distinct characteristics. It locks at the peak of the transmission function of the etalon instead of on its slope. In addition, the locking point relative to laser profile is always at where its spectral density is highest after convolution with the transmission function of the etalon. When such a locker is appropriately used, these features can offer a powerful means to enhance the performance of the laser to be stabilized, especially that of a DML.

Figure 2:
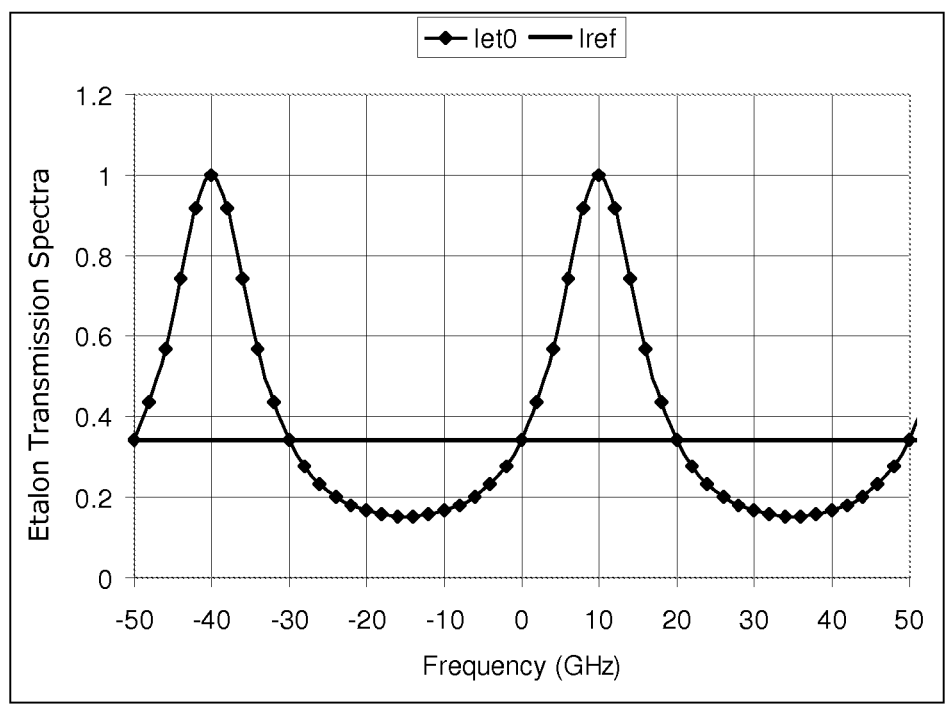
FIG. 2 is a graph of an embodiment of a plurality of transmission spectra from an etalon.

FIG. 2 is a graph of an embodiment of a plurality of transmission spectra from an etalon. In FIG. 2, the transmission spectra is obtained from a 50 GHz free spectral range etalon wavelength locker and a reference signal. The straight line is the reference signal, while the periodical line is from the signal transmitted through the etalon. These spectra are obtained by scanning a laser with a sufficiently narrow line width (narrower than the line width of the etalon) and plotting the received signals as a function of the laser wavelength.

Figure 3:
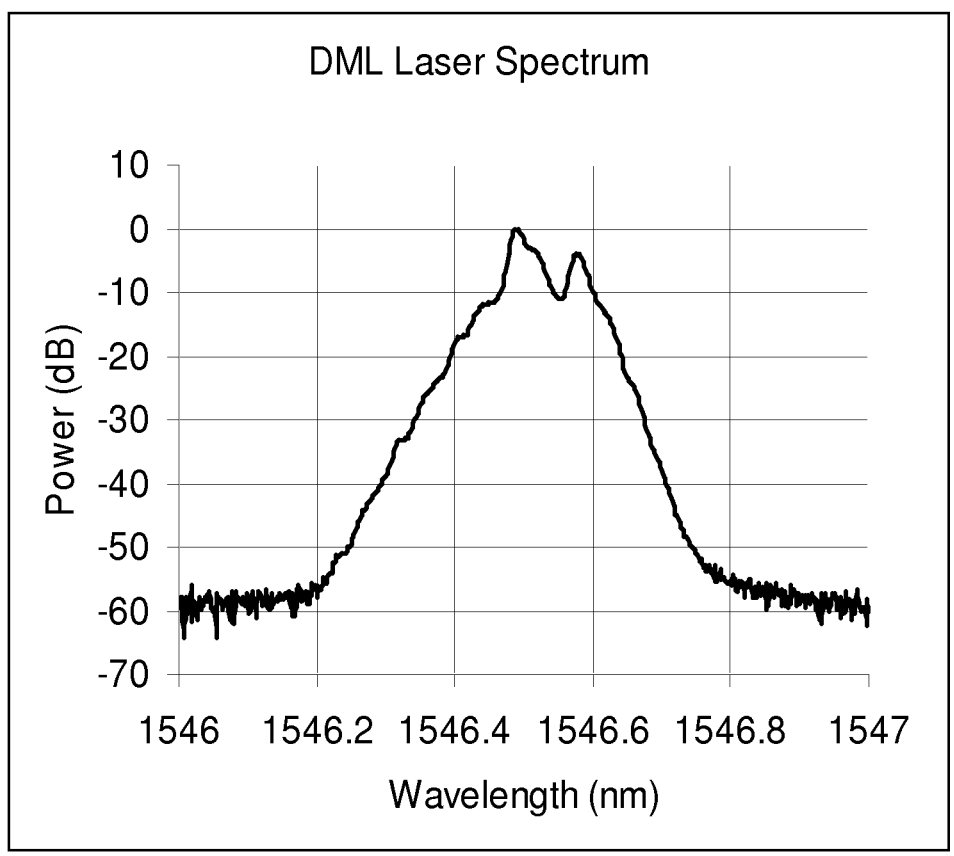
FIG. 3 is a graph of a DML spectrum at 10 G.

FIG. 3 shows a raw spectrum of a DML operated at 10 G with NRZ modulation. This spectrum was taken at a bias current of 38 mA above the lasing threshold and a peak-to-peak modulation of 50 mA. The sharp peak at the top of the spectrum approximates the adiabatic logical one position, the second peak at the longer wavelength side represents the adiabatic logical zero position and anything in between along with the broadening is a result of the transient chirp, typical of a DML.

Figure 4:
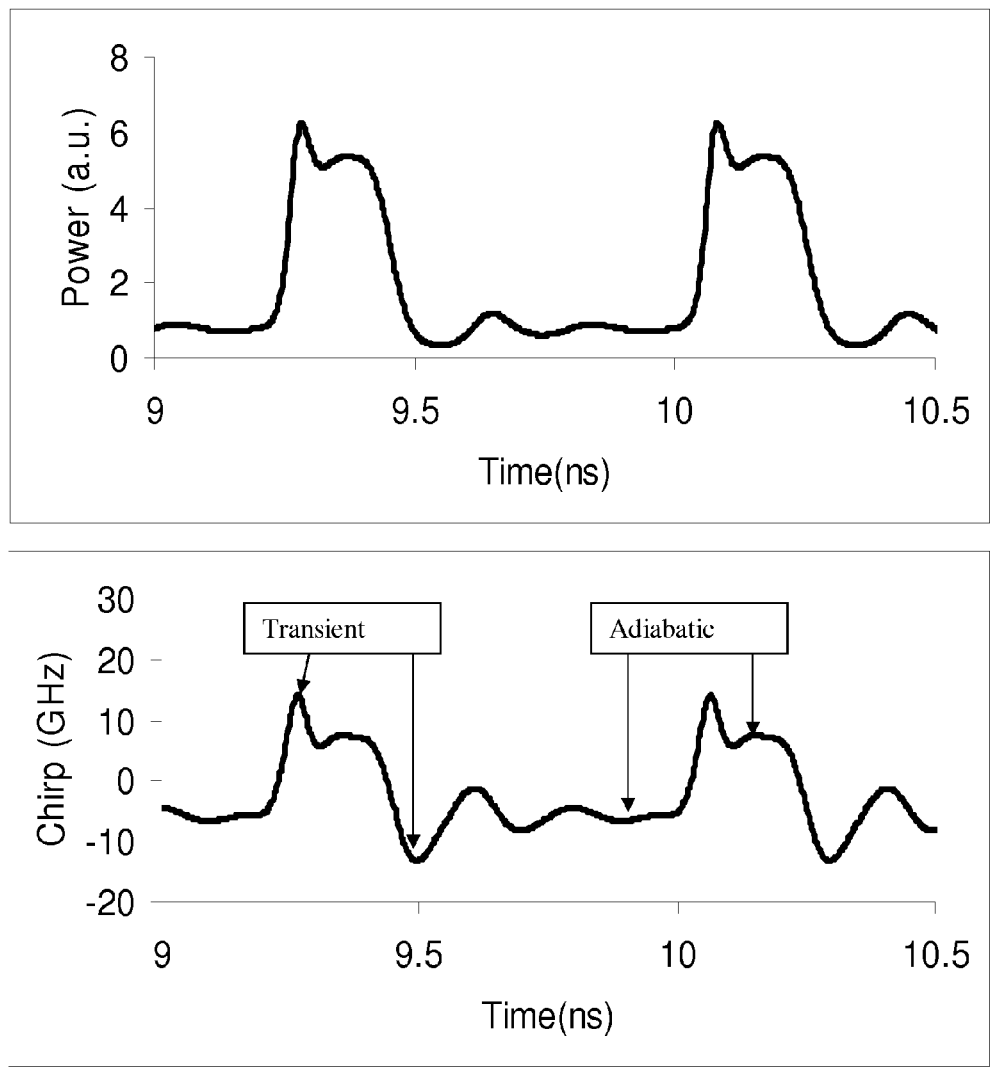
FIG. 4 is a graph of transient and adiabatic chirps for modulated NRZ data from a directly modulated laser.

The transient and adiabatic chirps of the DML are the major sources of impairment that limit the reach of a DML-based transmitter. FIG. 4 offers a pictorial view of the role each chirp component plays in modulated NRZ data as they travel down in an optical fiber. The leading edge of a pulse travels faster than the falling edge due to transient chirp as well as the dispersion of fibers, resulting in the broadening of the pulse. In addition, the adiabatic chirp causes the level of logical ones to have higher frequency (shorter wavelength) than that of logical zeros. This difference in frequency leads to inter-symbol interference (ISI) as the data propagate in the fiber, preventing it from being resolved correctly by the receiver. These are the major reasons why transmitters based on DML technologies are often limited to applications that do not require a long reach at high data rates (i.e., reaches longer than 40 km at 10 G and above).

Recently, efforts have been devoted to integrating DMLs with silica-on-silicon AWG to form DWDM transmitter arrays for use in transport networks. This hybrid integration turned out to be an excellent solution to high-density, low-cost transceivers used for the line side of a metro/regional network. However, because of its large transient and adiabatic chirps present in DML, its reach is limited without dispersion compensation. For example, one may add a dispersion compensation module along with an optical amplifier (such as, e.g., an Erbium doped fiber amplifier (EDFA)) in each span to make the DWDM transport network work properly. However, this increases the cost of building a network.

Figure 5:
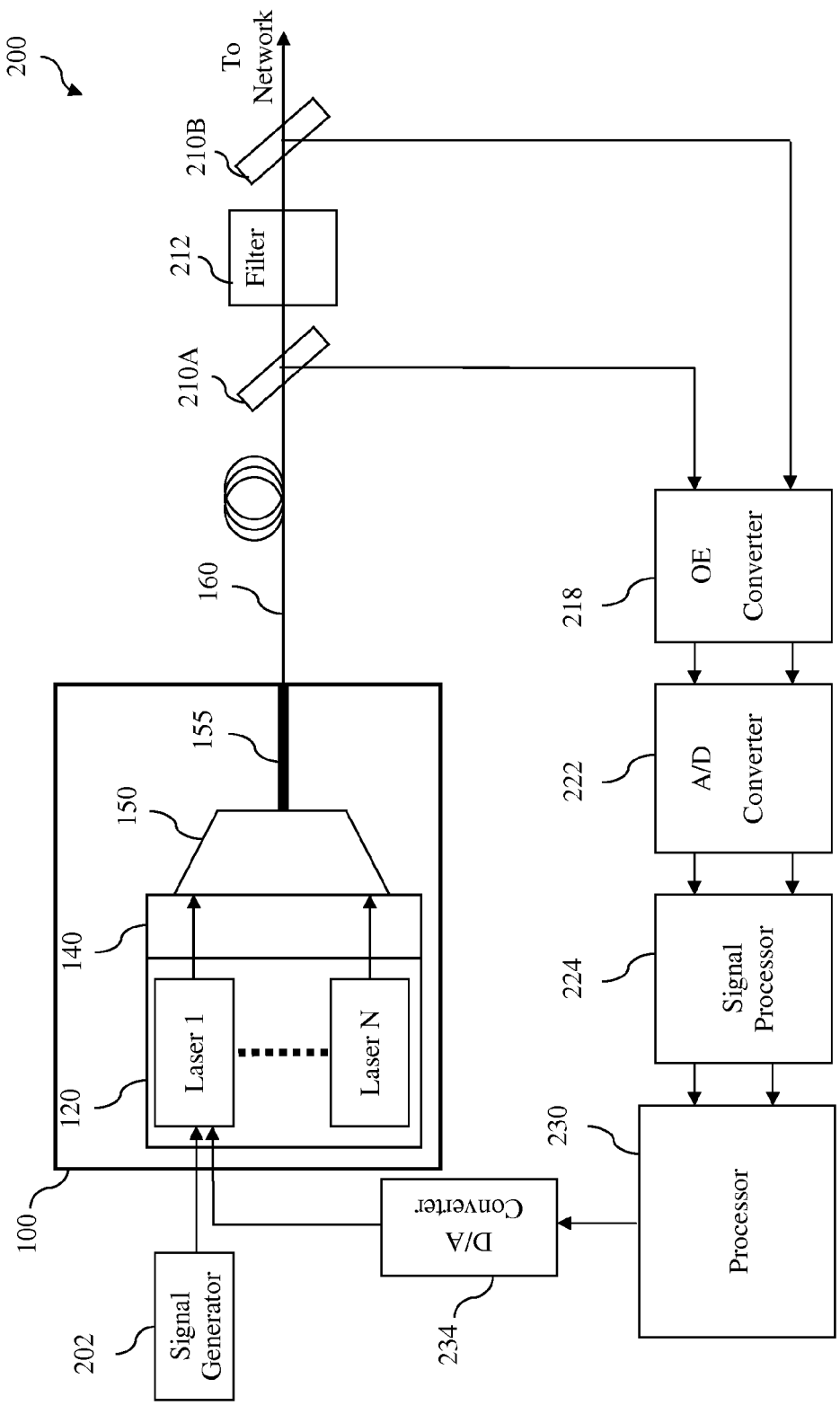
FIG. 5 is a schematic diagram of an embodiment of a WDM laser wavelength locking apparatus.

FIG. 5 is a schematic diagram of an embodiment of a wavelength locking system 200. The wavelength locking system 200 comprises the WDM laser transmitter 100, a signal generator 202, the fiber 160, a filter 212 between pre-filter splitter 210A and post-filter splitter 210B, an optical-electrical (OE) converter 218 coupled to the pre-filter splitter 210A and post-filter splitter 210B, an analog-to-digital (A/D) converter 222, a signal processor 224, a processor 230, and a digital-to-analog (D/A) converter 234, configured as shown in FIG. 5. In some embodiments, the OE convertor 218 is directly connected to the two splitters 210A and 210B with free space optical and they are integrated together to form an optical part of an etalon-based wavelength locker. As shown, the WDM laser transmitter 100 may comprise the laser dice 120, the first channels 140, the AWG 150, and the second channel 155, which may be substantially the same as described above. The remaining components of the WDM laser transmitter 100 are further described below.

In an embodiment, the signal generator 202 may be an electrical waveform generator and may be arranged so as to superpose a pilot signal onto the output of an individual laser of the laser dice. The signal generator 202 may generate a single pilot signal for all or a subset of all of the lasers in the laser dice 120. The superposition of the pilot signal onto the output of the laser of the laser dice 120 may facilitate subsequent distinction of the output of that laser from among a plurality of laser waveforms. In other embodiments, the pilot signal may be referred to as either a pilot tone or as dither. In an embodiment, the pilot signal may be a low-frequency alternating current (AC) sine wave. In alternative embodiments, the pilot signal may be a square wave, a sawtooth wave, or a triangle wave. The frequency of the pilot waveform may be lower than the frequencies of the output of the laser transmitter, such as about one thousandth of the frequency of the output of the laser transmitter, about one millionth of the frequency of the output of the laser transmitter, or any other fraction of the frequency of the output of the laser transmitter. In an embodiment, the relationship of the amplitude of the pilot signal to the average power of the laser transmitter combined output may be referred to as modulation depth (MD). The MD may be selected such that it is less than the output of the laser transmitter, such as about one hundredth of the average power of the laser transmitter output, about one thousandth of the average power of the laser transmitter output, or any other fraction of the power of the laser transmitter output. The values of both the MD and frequency of the pilot signal may be selected such that they minimize interference with the output of the WDM laser transmitter 100.

In an embodiment, the output of the WDM laser transmitter 100 may be directed into the fiber 160. The pre-filter splitter 210A may be arranged before the filter 212 to divide the signal from the fiber 160 into two signals: a first pre-filter signal directed into filter 212 and a second pre-filter signal directed into the OE convertor 218. The filter 212 may modify, alter, or delay the first pre-filter signal relative to the second pre-filter signal. In an embodiment, the filter 214 may be one of a Fabry-Perot interferometer, or other suitable filter, and may be air-spaced, solid, or of other configuration. In some instances, the filter 212 may be referred to as an etalon.

In an embodiment, the filter 212 may be a 50 GHz etalon, a 100 GHz etalon, or an etalon of other suitable frequency range or spacing. Meanwhile, the post-filter splitter 210B may be arranged after the filter 212 to divide the output of the filter 212 into two signals: a first post-filter signal directed into a network and a second post-filter signal directed into the OE convertor 218. In an embodiment, the pre-filter splitter 210A and post-filter splitter 210B may be of the dual prism type, the half-silvered mirror type, the dichroic mirror type, or other suitable splitter.

In at least some embodiments, the OE converter 218 may receive the second pre-filter signal from pre-filter splitter 210A (the second pre-filter signal is sometimes referred to herein as a reference signal) and may receive the second post-filter signal from the post-filter splitter 210B via fibers. Alternatively, the OE convertor 218 may be directly connected to the two splitters 210A and 210B with free space optical. In such embodiments, fibers between the OE converter 218 and splitters 210A, 210B are omitted (i.e., OE converter 218 forms an integral part of the etalon-based wavelength locker). The OE converter 218 may use an optical-to-electrical conversion process to convert the second pre-filter signal and the second post-filter signal from optical signals to electrical signals. In an embodiment, the OE converter 218 may be a photodiode (PD) or other suitable optical-to-electrical converter.

The A/D converter 222 may receive the second post-filter signal and the reference signal from the OE converter 218. The A/D converter 222 may convert the second post-filter signal and the reference signal from analog signals to digital signals. A/D converters 222 are well known in the art, and any suitable A/D converter may be used herein.

The signal processor 224 may receive the second post-filter signal and the reference signal from the A/D converter 222. Each of these two signals may then be processed by the signal processor 224, which converts them from the time domain to the frequency domain. For example, the signal processor 224 may implement a Fourier transform, a Fast Fourier transform (FFT), or any other suitable form of time domain to frequency domain processing.

The processor 230 may then process the signal data to facilitate wavelength locking of an individual laser of the laser dice 120. In an embodiment, the signal data may be represented mathematically by the following expressions:

$$F_s(\omega_p) = \sum_t V_s(t) \cdot e^{-i\omega_p t}$$

$$F_r(\omega_p) = \sum_t V_r(t) \cdot e^{-i\omega_p t}$$

where $F_s$ is a function of the second post-filter signal and $F_r$ is a function of the reference signal. $F_s$ and $F_r$ may represent the frequency domain waveforms that are detected by the OE converter 218, where $\omega_p$ is the frequency of the pilot signal, $V_s(t)$ is the time-domain waveform of the second post-filter signal, and $V_r(t)$ is the time-domain waveform of the reference signal. In some embodiments, the derived quadrature detection described herein is the base for enhancing the performance of a DML. This is because the quadrature detection technique allows a DML to be locked at the peak of the etalon which happens to coincide with the adiabatic 1's location of the modulated laser spectrum once the digital data is encoded with NRZ format.

For the quadrature detection, additional terms may be employed to represent aspects of the wavelength locking system 200. For example, P may be used to represent the power of the optical output signal of the laser to be locked, ΔP may represent the MD of the pilot signal, and $I_{et}$ may represent the transmission function of the filter 212. Also, $\Delta\omega_a$ may represent adiabatic chirp, and $\Delta\omega_{th}$ may represent thermal chirp, both of which may be introduced by the pilot signal. The term $\phi_{th}$ may be used to represent the phase delay of the thermal chirp relative to the adiabatic chirp, and $I'_{et}$ may represent the first derivative of $I_{et}$ with respect to frequency. Given these definitions, a ratio α of the second post-filter signal and the reference signal, e.g.

$$\alpha = \frac{F_s(\omega_p)}{F_r(\omega_p)},$$

may be derived. In an embodiment, the following expressions may represent the real and imaginary components of α:

$$I = \text{Re}\left[\frac{F_s(\omega_p)}{F_r(\omega_p)}\right] = I_{et}(\omega_c) + \frac{P}{\Delta P} \cdot I'_{et}(\omega_c) \cdot (\Delta\omega_a + \Delta\omega_{th} \cdot \cos(\phi_{th}))$$

$$Q = \text{Im}\left[\frac{F_s(\omega_p)}{F_r(\omega_p)}\right] = \frac{P}{\Delta P} \cdot I'_{et}(\omega_c) \cdot \Delta\omega_{th} \cdot \sin(\phi_{th})$$

where I represents the in-phase component of α, Q represents the quadrature component of α, and $\omega_c$ is the frequency of the laser to be wavelength locked. The two expressions for I and Q may be approximations obtained by neglecting the second and higher order derivatives of the transmission function of the filter 212. In addition, the quadrature component Q of α may be proportional to the first derivative of the transmission function $I'_{et}$ of the filter 212. Also, the adiabatic chirp induced by the pilot signal does not contribute to the quadrature response. Further, the thermal chirp and the related phase delay may only contribute to the magnitude of the quadrature frequency response. The quadrature component may be amplified by the inverse of the modulation depth, and may thereby provide enhanced signal detection. The signal characteristics may indicate that the quadrature component may facilitate effective wavelength locking of optical laser transmitters.

The characteristics of the quadrature component technique described herein provide a locking point that is very close to the adiabatic logic one position of a modulated DML transmitter. Variations between individual transmitters may only affect the error signal strength, not the locking point. In addition, the affect of this variation on the error signal strength may be minimized by appropriate choice of pilot signal frequency and MD. In an embodiment, an appropriate pilot signal frequency may be greater than or equal to about ten kHz and less than or equal to about 500 kHz, or other suitable frequency. In another embodiment, an appropriate MD may be about two percent of the output power of the average power of the WDM output, about five percent of the output power of the average power of the WDM output or other fraction of the power of the WDM output. Hence, the processor 230 may determine whether the optical transmitters (i.e., laser dice 120) are locked onto the appropriate wavelengths. If an optical transmitter or laser dice 120 is not locked onto the appropriate wavelengths, the processor 230 may generate an appropriate adjustment signal.

The D/A converter 234 may receive the adjustment signal from the processor 230. The D/A converter 234 may convert the adjustment signal from a digital signal to an analog signal. D/A converters 234 are well known in the art, and any suitable D/A converter may be used herein.

In an embodiment, the OE converter 218, the A/D converter 222, and the signal processor 224 may be arranged to have individual ports or channels to manage the two separate signals. In another embodiment, the two separate signals may be managed by arranging individual component OE converters 218, A/D converters 222, and/or signal processors 224 appropriately for each of the signals. Alternatively or additionally, the OE converter 218, the A/D converter 222, the signal processor 224, the processor 230, and/or the D/A converter 234 may be discrete components as shown or may be combined together into a single component.

In an embodiment, the quadrature component of cc may be employed as a component of time-domain multiplexing (TDM) to perform wavelength locking of multiple individual lasers of the WDM laser transmitter 100. In an embodiment, TDM may be employed when the signal generator 202 applies a pilot signal to a first laser optical transmitter n at timeslot $t_n$. The wavelength locker may detect the wavelength $\lambda_n$ of the laser optical transmitter n, based on recognition of the pilot signal applied to the laser optical transmitter n and instruct the laser optical transmitter n to tune its wavelength $\lambda_n$ to a target wavelength. This may be repeated for the next timeslot $t_{n+1}$ for transmitter n+1 , and so on until all laser optical transmitters have been wavelength locked accordingly.

In at least some embodiments, one may choose the location of the adiabatic logical one position to be slightly offset from the etalon peak to further optimize the transmission performance in the system. A typical range of the offset is between 0 and +/−10 G, which can be accomplished by modifying the quadrature detection method to lock at the desired point. For example, the quadrature detection method may be performed for a particular DML with Q and I equal to a first set of values to achieve a locking point that is very close to the adiabatic logic one position of a modulated DML transmitter output (e.g., when Q=0, the locking point is slightly to the right of the adiabatic logic one position towards the adiabatic logic zero position). Once this locking point has been achieved, the modulated DML transmitter output is analyzed to determine whether adjustment to the shape of the modulated DML transmitter output is needed for a particular application. As an example, the shape of the modulated DML transmitter output can be adjusted by changing the temperature of the DML until the modulated DML signal output from the etalon has a desired shape. Once the temperature adjustment is known for the DML, Q and I for the quadrature detection may be set to a second set of values based on the temperature adjustment. In some embodiments, the temperature adjustment and the quadrature detection adjustment for Q and I enables a locking point to be centered at the adiabatic logic one position or slightly to the left of the adiabatic logic one position (the shorter wavelength side) of the modulated DML transmitter output. An alternative approach for FIG. 4 is the use of frequency-division multiplexing where each channel uses its own dither frequency (pilot tone) to control multiple lasers.

To summarize, wavelength locking system 200 of FIG. 5 corresponds to an apparatus with plurality of optical transmitters (i.e., laser dice 120) and a wavelength locker (the feedback loop) shared by the plurality of optical transmitters. The filter 212 of wavelength locking system 200 is used for operations of the wavelength locker and is in a network communication path to shape optical transmissions from the plurality of optical transmitters 120 to a network. As shown in FIG. 4, part of an output of the filter 212 is directed into the network and another part of the output of the filter 212 is directed into the feedback loop.

The processor 230 in the wavelength locker feedback loop is configured to adjust a wavelength for each of the optical transmitters based on a transmission spectrum peak of the filter 212. The spectral shaping performed by the filter 212 is based on a predetermined Q-value for the filter 212 and the DML operating characteristics. As previously discussed, the wavelengths of the optical transmitters 120 may be adjusted by using the quadrature detection method disclosed herein to align the adiabatic logical one position of the modulated data signal with the transmission spectrum peak of the filter 212. Alternatively, the wavelengths of the optical transmitters 120 are adjusted by offsetting the adiabatic logical one position of the modulated data signal from the transmission spectrum peak of the filter 212 by a predetermined amount (e.g., by adjustment of the values for Q and I and by adjusting the temperature of the DML).

Figure 6:
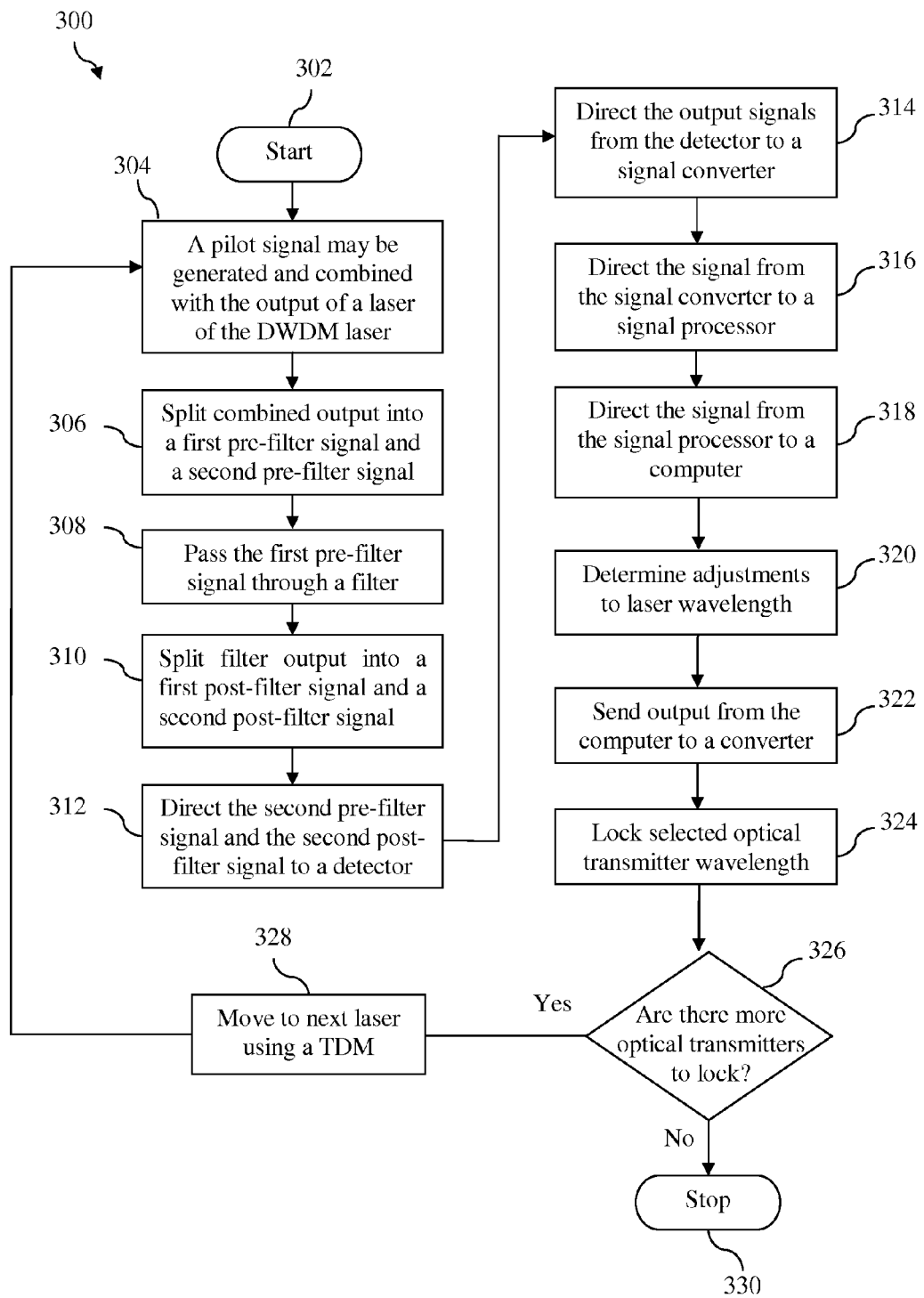
FIG. 6 is a flowchart of an embodiment of a WDM laser wavelength locking method.

FIG. 6 illustrates one embodiment of a TDM wavelength locking method 300. At block 302, the method 300 starts. At block 304, a pilot signal may be generated, e.g. using the signal generator, and combined with the output signal of a laser of the WDM laser transmitter that is to be wavelength locked. At block 306, the combined output signal of WDM laser transmitter and the pilot signal may be split into a first pre-filter signal and a second pre-filter signal (a reference signal) by, for example, a pre-filter splitter. At block 308, the first pre-filter signal is passed through a filter, such as an etalon filter.

At block 310, the filter output is split into a first post-filter signal and a second post-filter signal by, for example, a post-filter splitter. At block 312, the second pre-filter signal and the second post-filter signal are directed to a detector, such as an OE converter. At block 314, the output signals from the detector are directed to a signal converter. In other words, the second post-filter signal and the reference signal may be processed by, for example, an A/D converter. In an embodiment, the A/D converter may contain a memory (not shown) to temporarily collect and store a quantity of the signal. In an embodiment, the quantity of the stored signal may be an amount of time sufficient to provide resolution of the frequency of the pilot signal, for example about one tenth of the period of the pilot signal, about two tenths of the period of the pilot signal, about seven tenths of the period of the pilot signal, or other suitable fraction of the frequency of the pilot signal.

At block 316, the signal A/D converter output of the second post-filter signal and the signal A/D converter output of the reference signal may undergo additional processing, such as by a signal processor. In an embodiment, the signal processor may process the second post-filter signal and the reference signal, where processing may include FFT processing of the signals. The wavelength locking system may thereby obtain the quadrature component of $\alpha$. The magnitude and sign of the quadrature component of $\alpha$ may provide information of the deviation of the output wavelength of the WDM laser transmitter from the target wavelength. For example, if the sign of $\alpha$ is positive and the magnitude of $\alpha$ corresponds to an offset of 3 GHz, the WDM laser transmitter may be instructed to tune its wavelength in the negative direction 3 GHz.

At block 318, the output of the signal processor may be directed to a processor. In an embodiment, the processor may comprise a microprocessor, a computer, or any other computing device. At block 320, a determination is made regarding the magnitude and direction of adjustment of the laser wavelength. At block 322, information may be sent to the WDM laser transmitter instructing the WDM laser transmitter to tune its wavelength to the appropriate wavelength. In an embodiment, the tuning may employ adjusting the temperature of the laser or other means of adjustment to tune the wavelength of the WDM laser transmitter to the target wavelength. At block 324, the wavelength of the WDM laser transmitter may be considered locked at the target wavelength. At block 326, if there are more lasers to be locked, the wavelength locking system may move to the next laser on the laser dice, using the TDM scheme as described herein. At block 328, method 300 may repeat for each of N lasers in the laser dice. If at block 326, there are no more lasers to be locked, the method 300 may stop at block 330.

To summarize, a wavelength locking method (e.g., method 300) as disclosed herein may be performed by a wavelength locker feedback loop and/or a processor. Such wavelength locking methods may comprise receiving at least one digitized signal corresponding to an optical signal from an optical transmitter and to a pilot tone from a signal generator. A wavelength locking method also may comprise determining an adiabatic logical one position of the pilot tone and comparing the adiabatic logical one position to a transmission spectrum peak of a filter in an optical network communication path. For example, determining the adiabatic logical one position of the pilot tone may be accomplished by comparing a first digitized signal corresponding to a pre-filter version of the optical signal with a second digitized signal corresponding to a post-filter version of the optical signal. Further, to compare the adiabatic logical one position to a transmission spectrum peak of a filter, a wavelength locking method may determine a quadrature component of the adiabatic logical one position.

A wavelength locking method also may comprise determining whether an output from the optical transmitter needs to be adjusted based on the comparison. If an output from the optical transmitter needs to be adjusted, a wavelength locking method may generate a control signal based on a distance of the detected adiabatic logical one position from the transmission spectrum peak of the filter. Alternatively, the control signal may be generated based on a distance of the detected adiabatic logical one position from the transmission spectrum peak of the filter and based on a predetermined offset.

Figure 7:
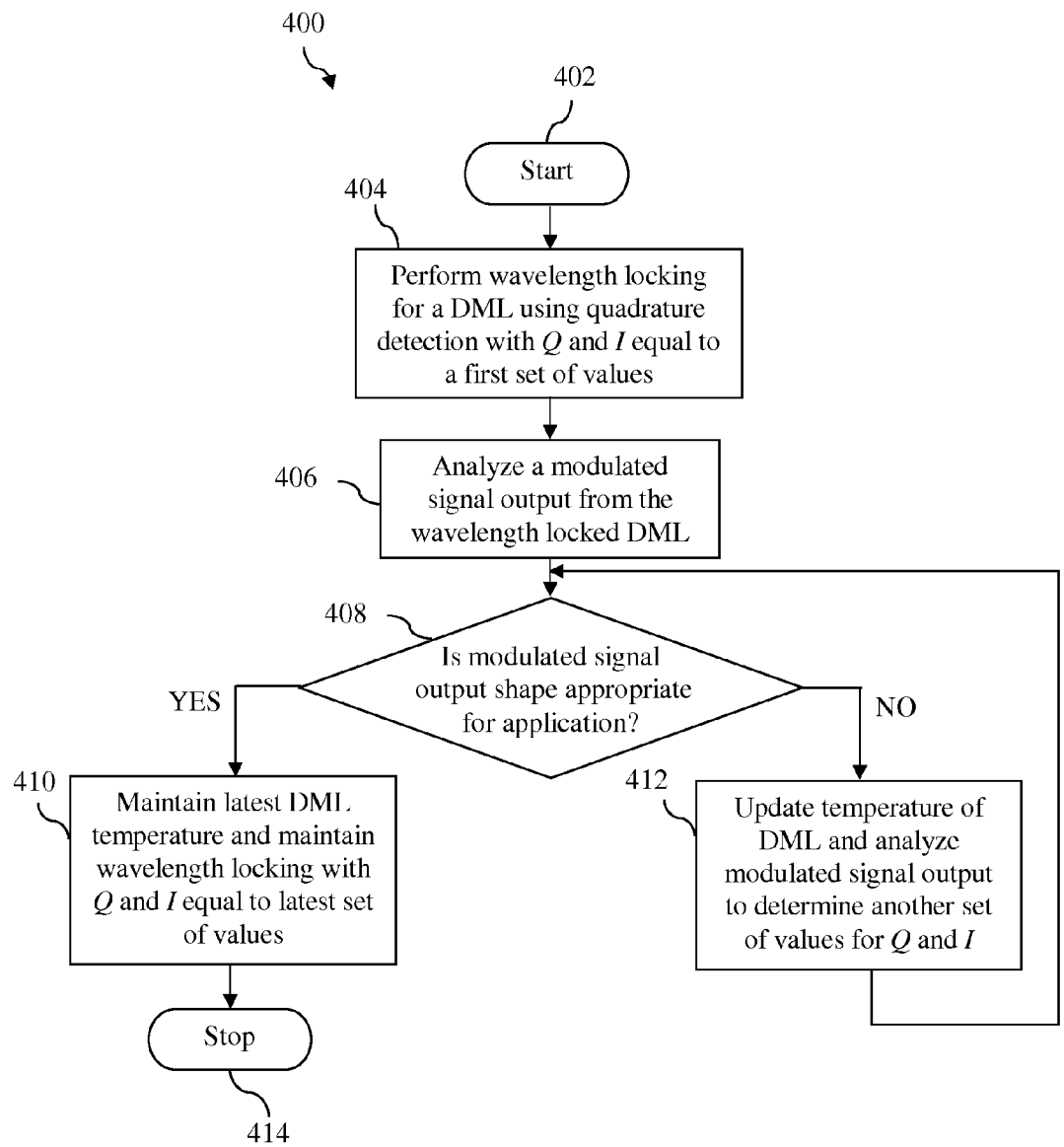
FIG. 7 illustrates a method for adjusting TDM wavelength locking for a particular application.

FIG. 7 illustrates a method 400 for adjusting TDM wavelength locking for a particular application (e.g., for a particular reach). The adjustment method 400 of FIG. 7 may be implemented, for example, with the wavelength locking method 300 of FIG. 6. At block 402, the method 400 starts. At block 404, wavelength locking for a DML is performed using quadrature detection with Q and I equal to a first set of values. At block 406, a modulated signal output from the wavelength locked DML is analyzed. If the modulated signal output shape is not appropriate for the application (decision block 408), the temperature of the DML is updated and the modulated signal output is analyzed to determine another set of values for Q and I (block 412). The method 400 then returns to decision block 408. If the modulated signal output shape is appropriate for the application (decision block 408), the latest DML temperature and wavelength locking with Q and I equal to the latest set of values is maintained (block 410), and the method stop at block 414.

Figure 8:
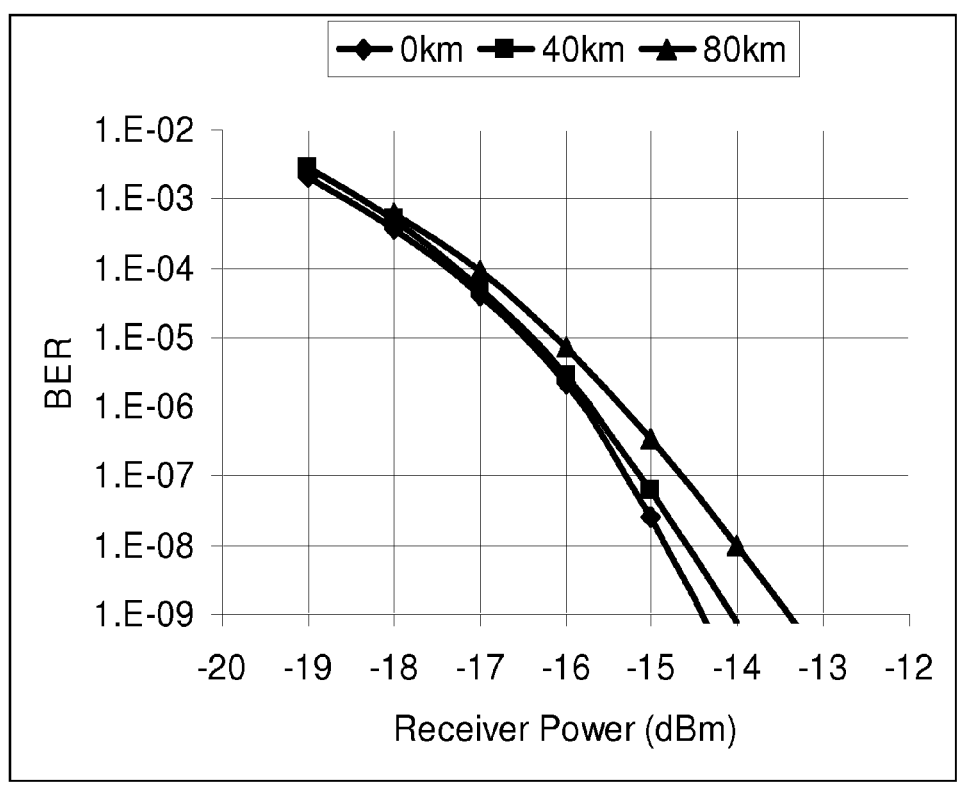
FIG. 8 is a waterfall curve of a DML array utilizing the method of FIG. 9.

FIG. 8 shows some experimental results using the proposed method. An etalon with ~5.5 dB attenuation at 10 GHz offset relative to its peak location is used here to simultaneously enhance and stabilize an arrayed 10 G DML transmitter which has channel spacing of 200 GHz. The bias and modulated currents used in the experiment are 80 mA and 50 mA respectively. In FIG. 8 the waterfalls from different reaches (40 km and 80 km) are compared with its back-toback one and it shows a weak dispersion penalty as a result of propagation. The etalon scheme disclosed herein not only locks the wavelengths to their respective ITU grid, but also improves its reach, suggesting that the transmitter has a potential for 40-km applications without the use of EDFA and 80 km without the need of DCM in a DWDM network—performance not obtainable with regular DMLs.

In an embodiment, the system and method taught herein may be implemented with off-the-shelf components that may be commercially available. In an embodiment, the wavelength locking system 200 of the present disclosure may be implemented as a frequency locking system, and some embodiments may therefore be described and/or implemented in a frequency domain scenario.

Figure 9:
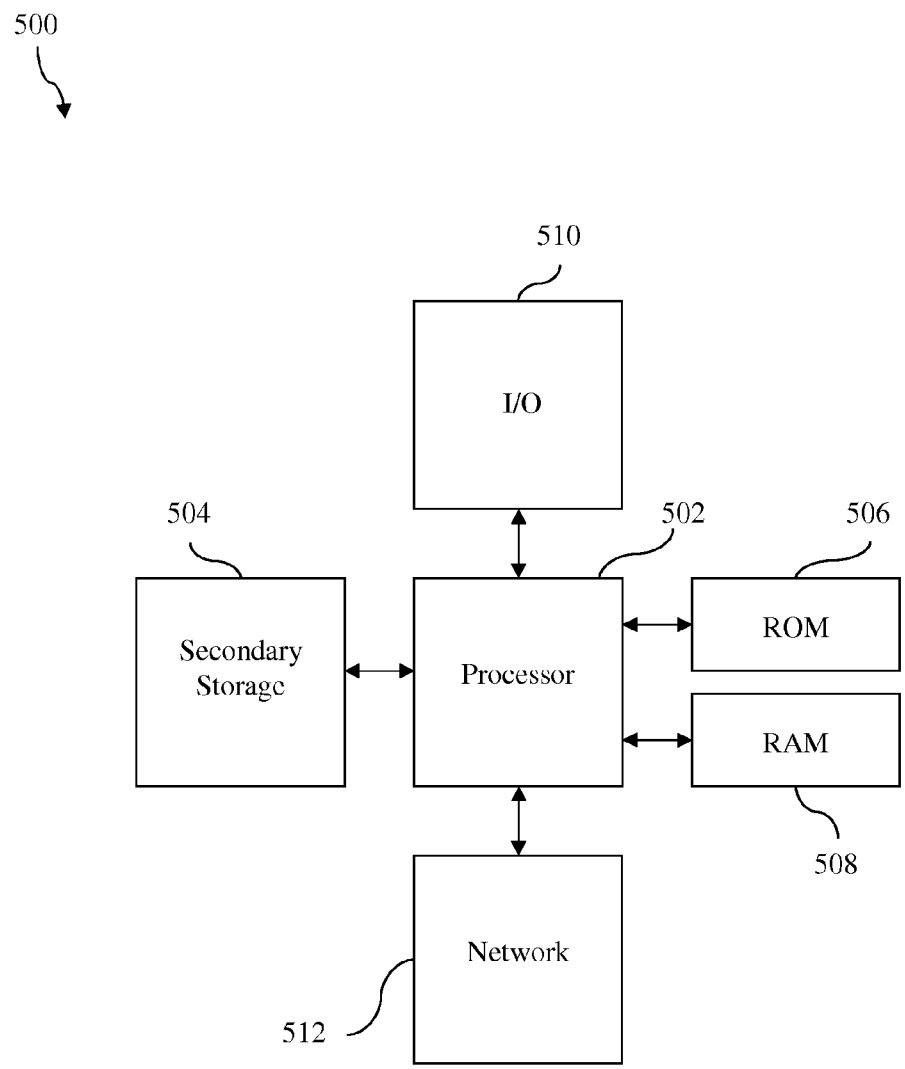
FIG. 9 is a schematic diagram of an embodiment of a general-purpose computer system.

FIG. 9 illustrates a typical, general-purpose computer, suitable for implementing one or more embodiments of any component disclosed herein. The computer 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than access to secondary storage 504.

In accordance with an embodiment, the processor 502 or 230 may receive a pre-filter signal corresponding to part of an optical signal comprising a pilot tone and may receive a post-filter signal corresponding to a part of the optical signal that passes through a filter, where a filtered part of the optical signal is directed into a network. The processor 502 or 230 may further perform wavelength locking for a DML using quadrature detection with Q and I equal to a first set of values (e.g., Q=0). This first wavelength locking aligns the adiabatic logical one position of the modulated data signal very close to the transmission spectrum peak of the etalon. If further adjustment is needed for the particular application, the temperature of the DML is updated and the modulated signal output is analyzed to determine a second set of values for Q and I, which can be uploaded to the processor 502 or 230. The processor 205 or 230 may subsequently perform wavelength locking for the DML operating at the updated temperature using quadrature detection with Q and I equal to the second set of values. This second wavelength locking aligns a center of the adiabatic logical one position (or slightly off to either the shorter wavelength side or the longer wavelength side) with the transmission spectrum peak of the etalon. In other words, the wavelength locking is fine-tuned for the particular application and laser to extend the transmission reach.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a plurality of optical transmitters; and
a wavelength locker shared by the optical transmitters and comprising:

a periodic transmission filter in a network communication path and configured to shape optical transmissions from the optical transmitters; and
a feedback loop comprising a pre-filter path, wherein the pre-filter path comprises:
a first optical splitter positioned between the optical transmitters and the periodic transmission filter,
a photodiode,
an analog-to-digital converter (ADC),
a fast Fourier transform (FFT) logic, and
a processor configured to adjust a wavelength for each of the optical transmitters based on input received via the pre-filter path.

2. The apparatus of claim 1, further comprising a signal generator coupled to the optical transmitters and configured to provide a pilot tone to each of the optical transmitters, wherein the processor is further configured to adjust the wavelength for each of the optical transmitters based on a transmission spectrum peak of the periodic transmission filter.

3. The apparatus of claim 2, wherein part of an output of the periodic transmission filter is directed out of the apparatus and another part of the output of the periodic transmission filter is directed into the feedback loop.

4. The apparatus of claim 1, wherein each optical transmitter comprises a directly modulated laser (DML), and wherein a transmission spectrum of the periodic transmission filter is configured to extend a range of DML transmissions to at least a threshold amount by reducing dispersion.

5. The apparatus of claim 1, wherein the periodic transmission filter is an etalon that performs spectral shaping for optical transmitter signals output from the apparatus, and wherein the spectral shaping is based on a predetermined quadrature component (Q) value for the periodic transmission filter and based on an adiabatic logical one position of the optical transmitter signals with a transmission spectrum of the periodic transmission filter.

6. The apparatus of claim 2, wherein the processor is further configured to perform wavelength locking based on quadrature detection with adjustable quadrature component (Q) and in-phase component (I) values.

7. The apparatus of claim 6, wherein the processor is further configured to adjust the Q and I values to fine-tune an alignment of an adiabatic logical one position of a modulated transmission signal with the transmission spectrum peak of the periodic transmission filter.

8. The apparatus of claim 1, wherein the pre-filter path originates in the network communication path.

9. The apparatus of claim 1, wherein the wavelength for each of the optical transmitters is locked sequentially during time-division multiplexing (TDM) using a sequence of dithers corresponding to pilot tones applied to the optical transmitters.

10. The apparatus of claim 1, wherein the wavelength for each of the optical transmitters is locked during frequency-division multiplexing (FDM), where each frequency channel uses its own dither frequency to control multiple optical transmitters.

11. An apparatus comprising:
a plurality of optical transmitters; and
a wavelength locker shared by the optical transmitters and comprising:
a periodic transmission filter in a network communication path and configured to shape optical transmissions from the optical transmitters; and
a feedback loop comprising a post-filter path, wherein the post-filter path comprises:
a first optical splitter coupled to an output of the periodic transmission filter,
a photodiode,
an analog-to-digital converter (ADC),
a fast Fourier transform (FFT) logic, and
a processor configured to adjust a wavelength for each of the optical transmitters based on input received via the post-filter path.

12. The apparatus of claim 11, wherein the wavelength for each of the optical transmitters is locked sequentially during time-division multiplexing (TDM) using a sequence of dithers corresponding to pilot tones applied to the optical transmitters.

13. The apparatus of claim 11, wherein the wavelength for each of the optical transmitters is locked during frequency-division multiplexing (FDM), where each frequency channel uses its own dither frequency to control multiple optical transmitters.

14. The apparatus of claim 11, wherein the feedback loop further comprises a pre-filter path comprising:
a second optical splitter positioned between the optical transmitters and the periodic transmission filter,
the photodiode,
the ADC,
the FFT logic, and
the processor, wherein the processor is further configured to adjust the wavelength for each of the optical transmitters based on input received via the pre-filter path.

15. An apparatus comprising:
a plurality of optical transmitters; and
a wavelength locker shared by the optical transmitters,
wherein a periodic transmission filter used for operations of the wavelength locker is in a network communication path and shapes optical transmissions from the optical transmitters to a network, and
wherein wavelengths for the optical transmitters are locked sequentially during time-division multiplexing (TDM) using a sequence of dithers corresponding to pilot tones applied to the optical transmitters.

16. An apparatus comprising:
a plurality of optical transmitters; and
a wavelength locker shared by the optical transmitters,
wherein a periodic transmission filter used for operations of the wavelength locker is in a network communication path and shapes optical transmissions from the optical transmitters to a network, and
wherein wavelengths for the optical transmitters are locked during frequency-division multiplexing (FDM), where each frequency channel uses its own dither frequency to control multiple optical transmitters.

* * * * *